A. Lind,
Water Wheel,
Nº 58846.   Patented Oct. 16, 1866.
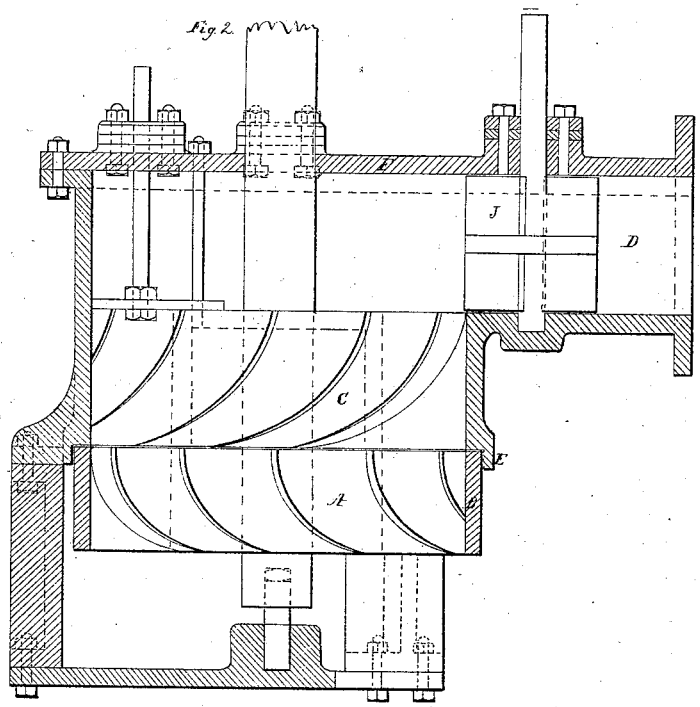
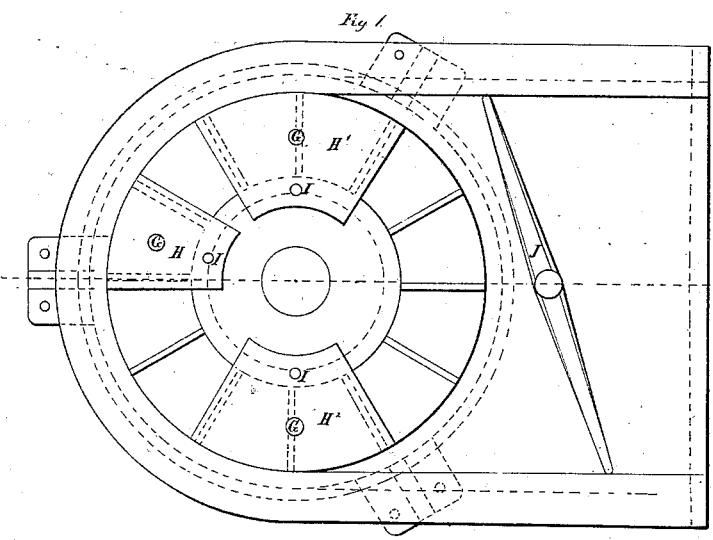
Witnesses:   Inventor:

UNITED STATES PATENT OFFICE.

ADOLPHUS LIND, OF SAN FRANCISCO, CALIFORNIA.

IMPROVEMENT IN WATER-WHEELS.

Specification forming part of Letters Patent No. 58,846, dated October 16, 1866.

*To all whom it may concern:*

Be it known that I, ADOLPHUS LIND, of the city and county of San Francisco, State of California, have invented certain new and useful Improvements in Jonval's Water-Wheel; and I do hereby declare that the following description and accompanying drawings are sufficient to enable any person skilled in the art or science to which they most nearly appertain to make and use my said improvements without further invention or experiment.

Referring to the drawings, Figure 1 is a plan of a water-wheel with the top plate off, showing the guide-buckets and stoppers of the stationary wheel; Fig. 2, a vertical section, showing the stationary wheel and movable wheel as seen if bisected at the dotted line in Fig. 1.

A represents the movable wheel, having the necessary number of buckets, of wrought-iron, the whole being surrounded by a rim, B, and cast together in one piece, the upper portion of the rim being turned off to form a joint in connection with the rim or flange of the stationary wheel. By this arrangement leakage is prevented, which is often very great when the wheel is working under great pressure.

The stationary wheel C consists of a rim having a given number of wrought-iron guides, the upper portion forming the gateway D, the lower portion being turned or cast to fit the upper rim, B, of the stationary wheel, forming a flange, E, with a close joint, (nearly) water-tight, within which the upper portion of the rim B rotates, so that in case the wheel should wear down on its bearings, leakage will still be prevented, the lip or flange extending sufficiently below for that purpose. This lip can also be carried down below the wheel, forming a cylinder, having a suction-pipe attached to it, for the purpose of using the fall below the wheel.

A plate, F, is firmly bolted through lugs to the top of the rim of the stationary wheel and gateway. Upon the top of this cover I place three movable plates with rubber packing, up through which vertical shafts G G G extend, being attached to stoppers H H$^1$ H$^2$, by which a part of the apertures of the stationary wheel may be closed or open, these stoppers having guide-rods I I I to slide up and down, tapped into the hub of the stationary wheel and fastened to the top of the cover by a nut with rubber packing.

This arrangement will be found absolutely necessary in order to keep up the percentage of the wheel when operating in dry seasons, or when there is a scarcity of water, or when less power is required, and without the delay incident to stopping the wheel to arrange the stops, as in other turbine wheels, as the arrangement is such that H$^1$ and H$^2$ cover two apertures each, and H only one. It will readily be seen that the apertures can be closed from one to five, according as the stream may rise or fall, by the three stoppers.

There is nothing novel in the gate J, which is constructed and operated in the usual way, with rubber packing around the shaft.

By constructing the rim of the movable wheel entire attached to the buckets, there is no perceptible leakage; consequently there is no power lost, as the full force of the water is expended before it leaves the wheel.

Having thus described my improved turbine wheel, what I claim, and desire to secure by Letters Patent, is—

In combination with the stoppers H H$^1$ H$^2$, the stationary wheel C and revolving wheel A, substantially as described.

In witness whereof I have hereunto set my hand and seal this 9th day of February, A. D. 1866.

ADOLPHUS LIND. [L. S.]

Witnesses:
C. W. M. SMITH,
GUS. A. MANTHEY.